(12) United States Patent
Ramirez

(10) Patent No.: US 12,077,107 B1
(45) Date of Patent: Sep. 3, 2024

(54) LICENSE PLATE COVER

(71) Applicant: Marlon Ramirez, Baldwin, NY (US)

(72) Inventor: Marlon Ramirez, Baldwin, NY (US)

( * ) Notice: Subject to any disclaimer, the term of this patent is extended or adjusted under 35 U.S.C. 154(b) by 0 days.

(21) Appl. No.: 18/375,630

(22) Filed: Oct. 2, 2023

Related U.S. Application Data

(60) Provisional application No. 63/454,541, filed on Mar. 24, 2023.

(51) Int. Cl.
*B60R 13/10* (2006.01)
*G09F 7/18* (2006.01)

(52) U.S. Cl.
CPC .............. *B60R 13/105* (2013.01); *G09F 7/18* (2013.01); *G09F 2007/1843* (2013.01); *G09F 2007/1895* (2013.01)

(58) Field of Classification Search
CPC ......... B60R 13/105; B60R 13/10; G09F 7/18; G09F 2007/1843; G09F 2007/1895; G09F 2007/1865
See application file for complete search history.

(56) References Cited

U.S. PATENT DOCUMENTS

| | | | | |
|---|---|---|---|---|
| 3,304,642 A * | 2/1967 | Dardis | .................. | B60R 13/105 D11/116 |
| 3,315,394 A * | 4/1967 | Kluck | .................. | B60R 13/105 40/209 |
| 5,383,294 A * | 1/1995 | Shen | ........................ | G09F 7/18 40/210 |
| 7,415,787 B2 * | 8/2008 | Eidsmore | .............. | B60R 13/105 40/201 |
| 7,836,618 B1 * | 11/2010 | Parenti | .................. | B60R 13/105 40/201 |
| 9,916,779 B1 * | 3/2018 | Parnell | ................ | G09F 13/0445 |
| 2008/0098629 A1 * | 5/2008 | Graham | .................. | B60R 13/10 40/201 |
| 2015/0068076 A1 * | 3/2015 | Knapschaefer | ....... | G09F 21/048 40/209 |
| 2019/0118734 A1 * | 4/2019 | Camisasca | ............ | B60R 13/105 |

FOREIGN PATENT DOCUMENTS

| | | | | |
|---|---|---|---|---|
| CN | 104442615 A | * | 3/2015 | .............. B60Q 1/30 |
| EP | 1031466 A1 | * | 8/2000 | ............. B60R 13/10 |
| RU | 183546 U1 | * | 9/2018 | |

* cited by examiner

*Primary Examiner* — Cassandra Davis
(74) *Attorney, Agent, or Firm* — Shore IP Group, PLLC; Sean R. Wilsusen

(57) ABSTRACT

A license plate cover system includes a base plate defining a first surface configured to face a vehicle. A second surface of the base plate is configured to face away from the vehicle. A side surface of the base plate connects the first surface with the second surface. The base plate includes protrusions extending from the side surface. A cover plate defines a first surface configured to face the second surface of the base plate. A second surface of the cover plate is configured to face away from the base plate. An inner side surface connects the first surface of the cover plate with the second surface of the cover plate. The cover plate includes recesses configured to receive the protrusions therein. The cover plate is configured to be removably coupled with base plate by securing the protrusions in corresponding recesses of the plurality of recesses.

20 Claims, 12 Drawing Sheets

LICENSE PLATE COVER

CROSS-REFERENCE TO RELATED APPLICATION

The present application claims the benefit of and priority to U.S. Provisional Patent Application No. 63/454,541, filed on Mar. 24, 2023, the entire contents of which are incorporated by reference herein.

FIELD

The present disclosure relates to a cover, and more particularly, to a license plate cover system.

BACKGROUND

A vehicle registration plate, also referred to as a number plate or a license plate, is a metal or plastic plate attached to a motor vehicle or trailer for official identification purposes. Most countries require registration plates for road vehicles such as cars, trucks, and motorcycles. License plates may be required in some jurisdictions for other vehicles, such as bicycles, boats, or tractors. However, license plates can degrade over time, such as by rusting, and the alphanumeric characters displayed on license plates can become less visible over time. Attachment mechanisms for license plates can also degrade over time, which can result in weak connections between license plates and motor vehicles. Additionally, rusted or otherwise degraded license plates can create an unsightly presence on a motor vehicle.

SUMMARY

Provided in accordance with aspects of the present disclosure is a license plate cover system including a base plate defining a first surface configured to face a vehicle. A second surface of the base plate is configured to face away from the vehicle. A side surface of the base plate connects the first surface with the second surface. The base plate includes protrusions extending from the side surface of the base plate. A cover plate defines a first surface configured to face the second surface of the base plate. A second surface of the cover plate is configured to face away from the base plate. An inner side surface of the cover plate connects the first surface of the cover plate with the second surface of the cover plate. The cover plate includes recesses configured to receive the protrusions therein. The cover plate is configured to be removably coupled with base plate by securing the protrusions in corresponding recesses.

In an aspect of the present disclosure, at least two orifices are defined through the first surface and the second surface of the base plate. The orifices are configured to secure the base plate to the vehicle.

In an aspect of the present disclosure, at least two recesses are defined in the first surface of the cover plate. Each recess defined in the first surface of the cover plate is configured to receive a corresponding head of a connecting member connecting the based plate with the vehicle.

In an aspect of the present disclosure, the connecting member includes a screw, bolt, nail, fastener, pine, tack, spike, or rivet.

In an aspect of the present disclosure, a cradle is defined by the first surface of the base plate. The cradle is configured to receive a license plate therein. The orifices defined through the first surface and the second surface of the base plate are configured to be aligned with corresponding license plate orifices when the license plate is arranged in the cradle.

In an aspect of the present disclosure, a lip projects from the first surface of the cover plate. The lip is configured to wrap around the base plate to removably secure the cover plate with the base plate.

In an aspect of the present disclosure, the lip is defined circumferentially around the first surface of the cover plate.

In an aspect of the present disclosure, the lip includes a material different from a material included in the cover plate.

In an aspect of the present disclosure, the base plate includes metal or plastic, and wherein the cover plate includes silicone.

In an aspect of the present disclosure, the second surface of the cover plate defines at least one decorative feature facing away from the vehicle.

In an aspect of the present disclosure, the at least one decorative feature includes at least one recess defined in the second surface of the cover plate, wherein the at least one recess is configured to removably receive a decorative insert therein.

Provided in accordance with aspects of the present disclosure is a license plate cover system including a protrusion extending along a side surface of a base plate.

In an aspect of the present disclosure, the protrusion extends circumferentially around the side surface of the base plate. The protrusion may extend continuously and completely circumferentially around the entire side surface of the base plate.

In an aspect of the present disclosure, a single protrusion may extend along each of the top, bottom, right, and left side surfaces of the base plate.

In an aspect of the present disclosure, a corresponding recess is formed in a side surface of a cover plate.

BRIEF DESCRIPTION OF THE DRAWINGS

Various aspects and features of the present disclosure are described hereinbelow with reference to the drawings wherein.

DETAILED DESCRIPTION

Figure 1:
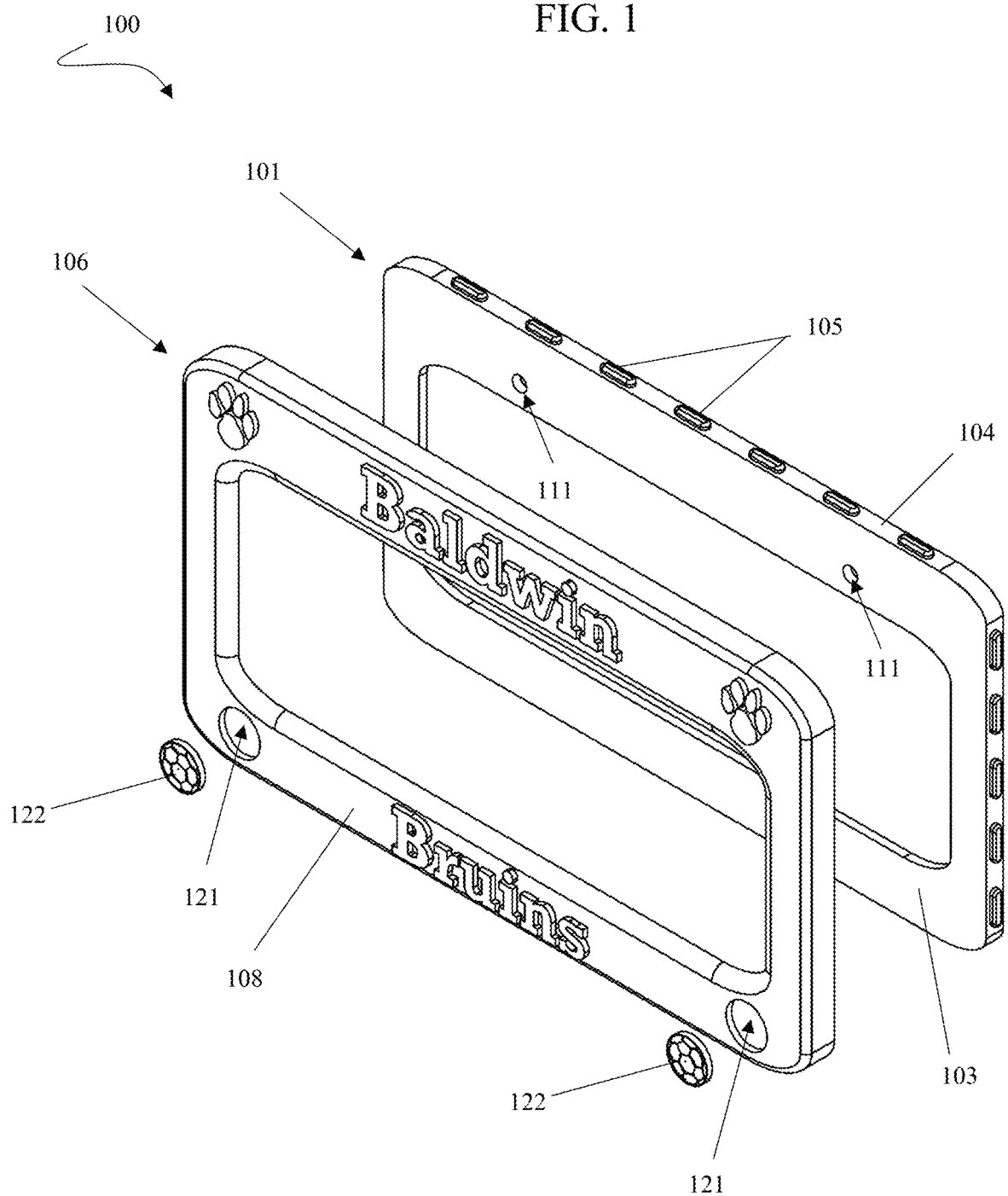
FIG. 1 is a front, perspective view of a license plate cover system according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Referring to FIGS. 1 to 4, a license plate cover system 100 includes a base plate 101 defining a first surface 102 configured to face a vehicle. A second surface 103 of the base plate 101 is configured to face away from the vehicle. A side surface 104 of the base plate 101 connects the first surface 102 with the second surface 103. The vehicle may be a motorized vehicle such as a car, van, truck, bus, motorcycle, scooter, golf cart, or an E-bike or other electrically operated vehicle. Alternatively, the vehicle may be a mechanically powered vehicle, such as a bicycle, tricycle, handcycle, mobility scooter, quadracycle, or a wheelchair.

The base plate 101 includes protrusions 105 extending from the side surface 104 of the base plate 101. A series of protrusions 105 may be spaced apart from each other along each of the right, left, top, and/or bottom surfaces of the base plate 101. The protrusions 105 may intermittently be arranged circumferentially around the base plate 101 and may be arranged in positions corresponding with positions of recesses 110. The protrusions 105 may intermittently be arranged on any combination of one or more of the right, left, top, and/or bottom side surfaces of the base plate 101.

A cover plate 106 defines a first surface 107 configured to face the second surface 103 of the base plate 101. A second surface 108 of the cover plate 106 is configured to face away from the base plate 101. An inner side surface 109 of the cover plate 106 connects the first surface 107 of the cover plate 106 with the second surface 108 of the cover plate 106. The cover plate 106 includes recesses 110 configured to receive the protrusions 105 therein. The cover plate 106 is configured to be removably coupled with base plate 101 by securing the protrusions 105 in corresponding recesses 110. The recesses 110 may extend partially or entirely through the inner side surface(s) 109 of the cover plate 106.

The base plate 101 and cover plate 106 include open spaces in central regions thereof to allow the alphanumeric characters of a corresponding license plate (see, e.g., license plate 130 in FIG. 4) to be visible. That is, the base plate 101 and cover plate 106 cover edge portions of the license plate, but not portions of the license plate that need to be visible to identify the corresponding vehicle.

In an aspect of the present disclosure, at least two orifices 111 are defined through the first surface 102 and the second surface 103 of the base plate 100. The orifices 111 are configured to secure the base plate 101 to the vehicle, such as be inserting or threading connection members through the orifices 111 and into the vehicle.

In an aspect of the present disclosure, at least two recesses 112 (see, e.g., FIG. 3) are defined in the first surface 107 of the cover plate 106. Each recess 112 defined in the first surface 107 of the cover plate 106 is configured to receive a corresponding head of a connecting member connecting the based plate 106 with the vehicle. The connecting member may be a screw, bolt, nail, fastener, pine, tack, spike, or rivet, or any other connecting member employed to connect a license plate with a vehicle. While the connecting member may include a protruding head, the connecting member may also include a flat head, such as a counter sunk screw head that is configured to be substantially flush with the second surface 103 of the base plate 101. The head of a connecting member may define, for example, have a circular, oval, square, pentagonal, hexagonal, heptagonal, octagonal, or rectangular shape, and the recess(es) 112 correspondingly define a size and shape configured to receive the head of the connecting member.

Figure 3:
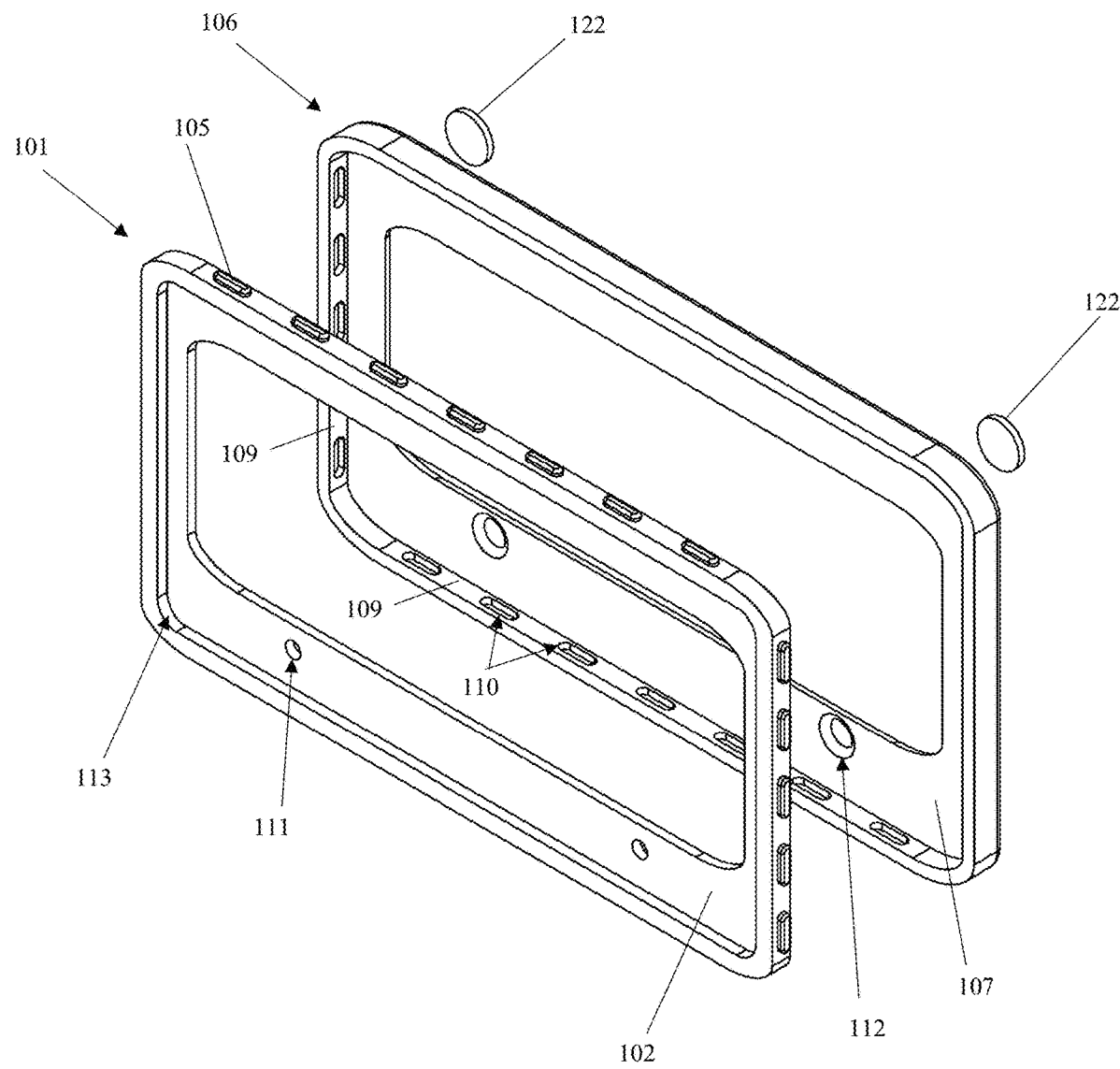
FIG. 3 is a rear, perspective view of the license plate cover system of FIG. 1.
Figure 4:
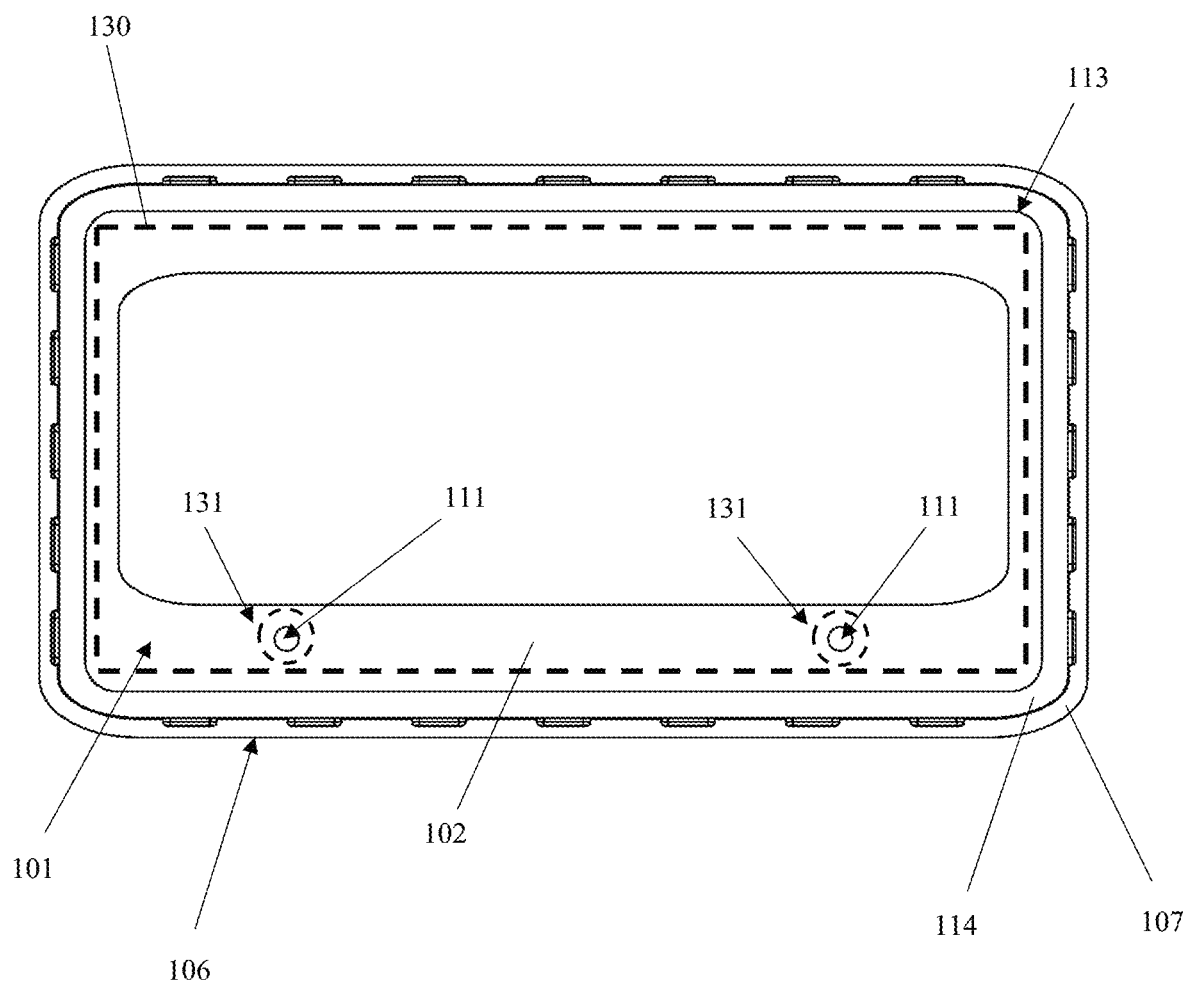
FIG. 4 is a rear view of the license plate cover system of FIG. 1.

Referring particularly to FIGS. 3 and 4, a cradle 113 is defined by the first surface 102 of the base plate 101. The cradle 113 is configured to receive a license plate (see, e.g., license plate 130 in FIG. 4) therein. The cradle 113 may include an inward-facing sidewall 313. The inward-facing sidewall 313 may have substantially a same thickness as a license plate so that the license plate and base plate 101 sit flush against a vehicle. The inward-facing sidewall 313 may be defined completely circumferentially around the base plate 101.

The orifices 111 defined through the first surface 102 and the second surface 103 of the base plate 101 are configured to be aligned with corresponding license plate orifices 131 when the license plate is arranged in the cradle 113 (see, e.g., FIG. 4).

Referring particularly to FIG. 4, a lip 114 projects from the inner side surface 109 of the cover plate 106. The lip 114 is configured to wrap around the base plate 101 to removably secure the cover plate 106 with the base plate 101. The lip 114 may be defined circumferentially around the entire inner side surface 109 of the cover plate 106. The lip 114 may project toward a central area 140 of the cover plate 106. The lip includes or is formed of a material that is sufficiently pliable enough to wrap around the side surface 104 and/or first surface 102 of the cover plate 101 to at least partially assist in securing the cover plate 106 with the base plate 101. As an example, the lip 114 may be formed of or may include one or more of silicone, thermoplastic elastomer (TPE), polypropylene (PP), rubber, neoprene, silicone rubber, ethylene propylene diene monomer (EPDM) rubber, or other similarly pliable materials.

The lip 114 may include a material different from a material included in the cover plate 101. For example, the lip 114 may include a material that is more pliable than a material included in or used to form the cover plate 106. Alternatively, the cover plate 106 and the lip 114 may include or may be formed of the same material, such as the relatively pliable materials described herein.

In an aspect of the present disclosure, the base plate 101 includes or is formed of a more rigid material than the cover plate 106. For example, base plate 101 may include metal or plastic, and the cover plate 106 may include silicone or another similarly pliable material, as described herein.

Figure 2:
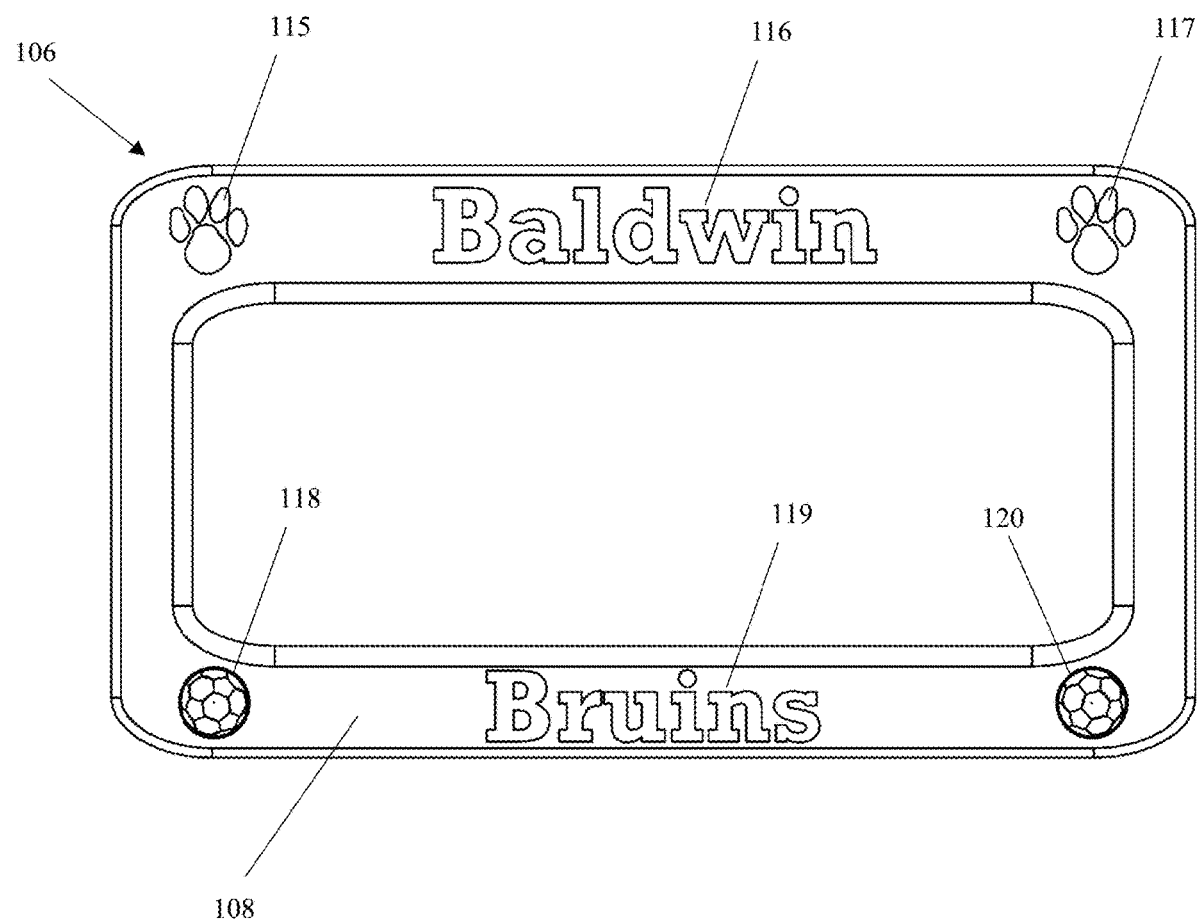
FIG. 2 is a front view of the license plate cover system of FIG. 1.

Referring particularly to FIGS. 1 and 2, the second surface 108 of the cover plate 106 defines at least one decorative feature (e.g., one or more of features 115, 116, 117, 118, 119, and/or 120) facing away from the vehicle.

In an aspect of the present disclosure, the decorative feature includes at least one recess 121 defined in the second surface 108 of the cover plate 106. The recess 121 is configured to removably receive a decorative insert 122 therein. The decorative feature(s) of the cover plate 106 may include one or more custom molded features, such as a sports team name and a town or state associated with the sports team. The decorative feature(s) of the cover plate 106 may be formed as recessed patterns in the second surface 108 of the cover plate 106 or may include projections extending beyond the second surface 108 of the cover plate 106. The decorative feature(s) may also be formed as an image, such as a flat image, on the second surface 108 of the cover plate 106. For example, the image may be silk screened (see, e.g., FIG. 6) onto the second surface 108 of the cover plate 106 or may be applied as a sticker or decal. The image may be painted directly onto the second surface 108 of the cover plate 106. The image may also be formed in the second surface 108 of the cover plate 106 by an injection molding, 3D printing, or other similar process used to form the cover plate 106.

The decorative feature(s) of the cover plate 106 may include six or more features, each of which can be customized. While two recesses 121 are shown and described such that decorative inserts can be inserted into or removed from recesses 121, each of the decorative features may similarly be added or removed by employing corresponding recesses. For example, each of features 115, 116, 117, 118, 119, and/or 120 can be formed on insert plates that are inserted into or removed from corresponding recesses formed in the second surface 108 of the cover plate 106. Thus, each of the decorative features can be changed periodically, as desired by a user, and any custom combination of decorative features can be added to or removed from the second surface 108 of the cover plate 106, as desired.

Figure 5:
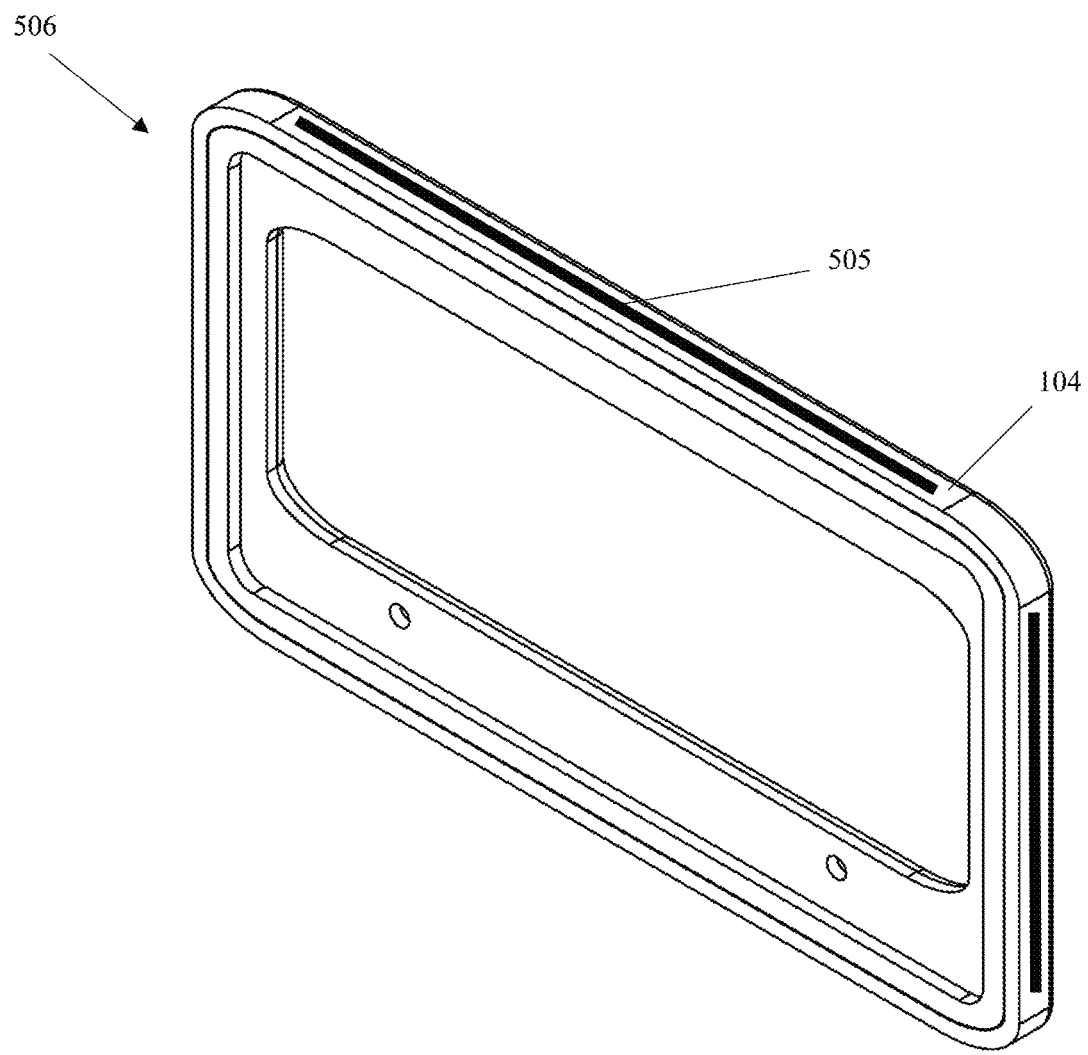
FIG. 5 is a rear, perspective view of another base plate employable by the license plate cover system of FIG. 1.

Referring particularly to FIG. 5, an alternative base plate 506 including one or more protrusions 505 extending along a side surface 504 of the base plate 506 can be employed by the license plate cover system 100 described herein.

As an example, the protrusion 505 may extend circumferentially around the side surface 504 of the base plate 506. The protrusion 505 may extend continuously and completely circumferentially around the entire side surface 504 of the base plate 506. Alternatively, a single protrusion 505 may extend along each of the top, bottom, right, and/or left side surfaces of the base plate 506. A corresponding recess (see, e.g., recesses 110) is formed in a side surface of a cover plate (see, e.g., cover plate 106) in each location in which a corresponding protrusion 505 is formed.

In use, and referring to FIGS. 1 to 5, license plate 130 is inserted into cradle 113 of base plate 101 with at least two orifices 131 of the license plate 130 aligned with orifices 111 of the base plate 101 and then the base plate 101 and license plate 130 are connected with a vehicle using screws, bolts, or other connecting means threaded into the vehicle through the orifices 131 of the license plate 130 aligned with orifices 111 of the base plate 101. Thus, the base plate 101 and license plate 130 are connected with the vehicle in a semi-permanent connection. The cover plate 106 can then be connected to the base plate 101 without the use of any hardware, such as by connecting protrusions 105 with corresponding recesses 110. The cover plate 106 is sized, shaped, and dimensioned to snuggly fit the size, shape, and dimensions of the base plate 101 such that lateral pressure is naturally applied between the cover plate 106 and the base plate 101 to prevent unwanted separation of the cover plate 106 from the base plate 101. The lip 114 described herein may also be employed to prevent unwanted movement or separation of the cover plate 106.

In an aspect of the disclosure, there is a snap-fit connection created by the protrusions 105 and the corresponding recesses 110 when the cover plate 106 is "snapped onto" the base plate 101 to connect each of the protrusions 105 and the corresponding recesses 110 (see, e.g., FIG. 4 illustrating the cover plate 106 connected with the base plate 101).

The lip 114 and/or pliable nature of the cover plate 106 also make removing the cover plate 106 easy, so that different cover plates 106 can be easily added or removed, while the base plate 101 and license plate remain coupled to a vehicle in a semi-permanent state. The cover plate 106 also protects that side surface 104 of the base plate 101, thus reducing or preventing damage to the base plate 101. If damage occurs to a cover plate 106, the cover plate 106 can be replaced without the need to replace the base plate 101.

The cover plate 106 is configured to cover or conceal all hardware used to secure the base plate 101 and the license plate (e.g., license plate 130) to a vehicle, thus reducing or preventing damage to any of the connecting hardware, such as rusting, chipping, bending, or other damage from occurring to any connecting hardware.

The integrated structure of the license plate 130 and the base plate 101 protects as much of the surface area of the license plate 130 as possible while still allowing the alphanumeric characters of the license plate 130 to be visible through the open space in the central region of the base plate 101 and cover plate 106. The base plate 101 covers the edges of license plate 130 and reduces or prevents rusting, chipping, bending, or other damage.

Figure 6:
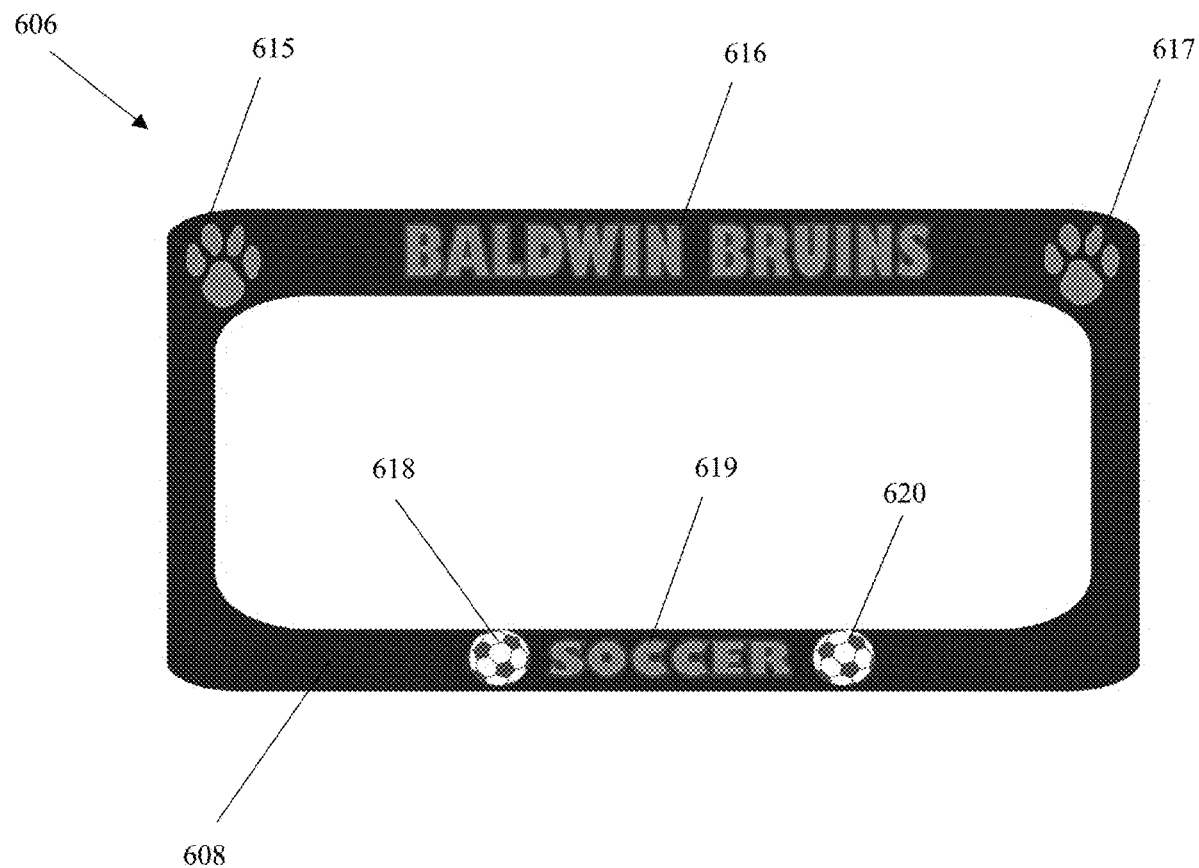
FIG. 6 is a front view of a cover plate employable by the system of FIG. 1.

Unless otherwise indicated below, cover plate 606 described with reference to FIG. 6 is substantially the same as cover plate 106, and thus duplicative descriptions may be omitted below.

Referring particularly to FIG. 6, the images or decorative features described herein may be silk screened onto the second surface 608 of the cover plate 606 or may be applied as a sticker or decal. For example, the second surface 608 may be a substantially and continuously flat surface configured to receive a flat image thereon. The flat image may be painted, applied with adhesive decals, printed directly onto, or silk-screened directly onto the second surface 608 of the cover plate 606.

As an example, each of decorative features 615, 616, 617, 618, 619, and/or 620 may be printed, silk-screened, or otherwise applied as a flat image onto the second surface 608 of the cover plate 606.

Figure 7:
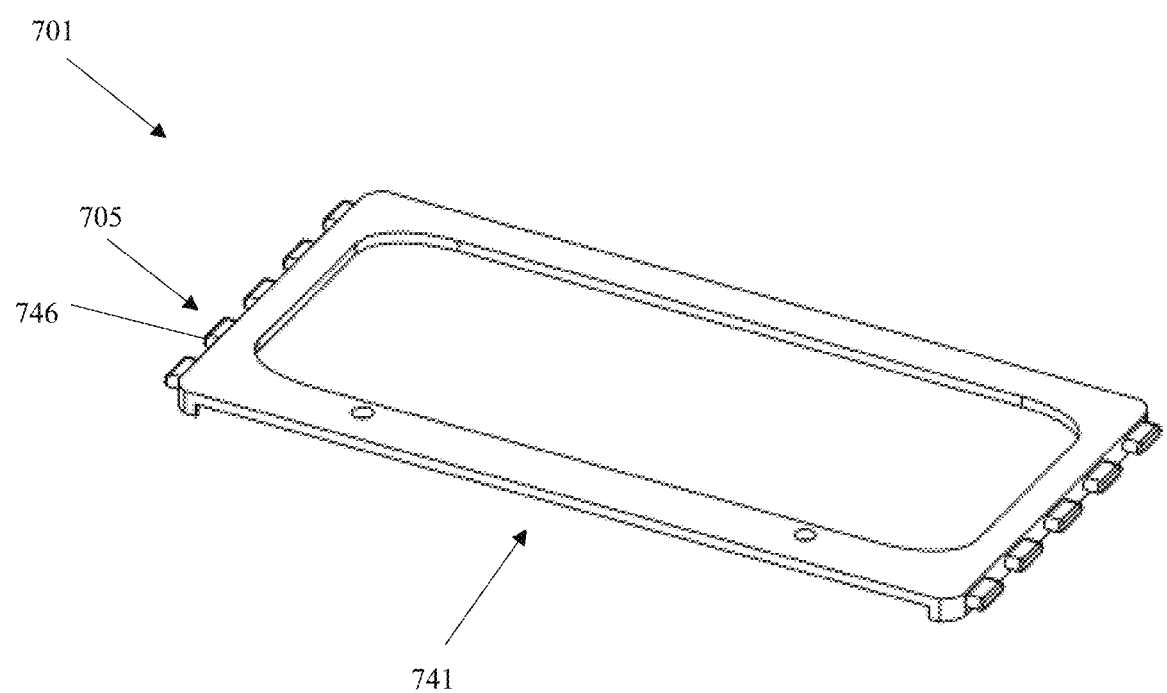
FIG. 7 is a front, perspective view of a base plate employable by the license plate cover system of FIG. 1.

Unless otherwise indicated below, base plate 701 described with reference to FIG. 7 is substantially the same as base plate 101, and thus duplicative descriptions may be omitted below.

Referring particularly to FIG. 7, base plate 701 omits at least one of the upper or lower sides thereof (omitted with respect to base plate 101) to define an open channel 741. Channel 741 allows a license plate to be inserted or removed therethrough. The open channel 741 formed by omitting a portion of the upper or lower sides (omitted with respect to base plate 101) allows the base plate 701 to fit into a relatively small license plate housing of a vehicle. For example, a recessed license plate housing having upper, lower, and/or side overhangs, may provide limited space to receive a license plate cover, and thus providing the base plate 701 having a reduced size allows the base plate 701 to fit within the upper, lower, and/or side overhangs of a vehicle. The open channel 741 may be covered by a cover plate, as described herein.

While an open channel 741 is shown and described as formed in one of the upper or lower sides of the base plate 701, a similar open channel may be formed in each of the upper and lower sides of the base plate 701 by omitting portions of the upper and lower sides of a base plate.

Figure 8A:
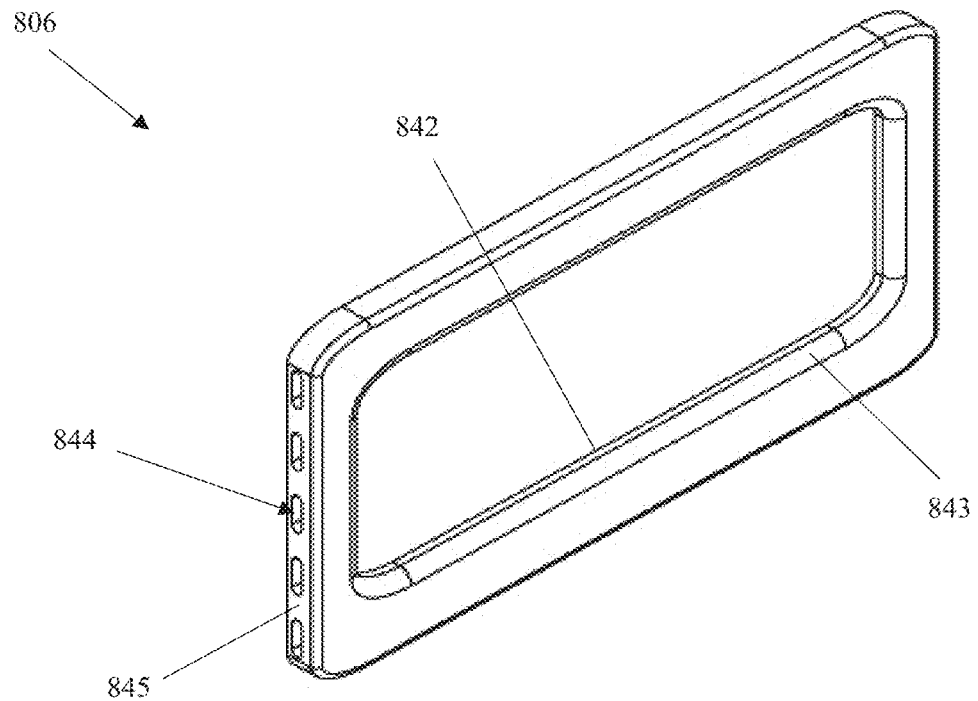
FIG. 8A is a front, perspective view of a cover plate employable by the license plate cover system of FIG. 1.
Figure 8B:
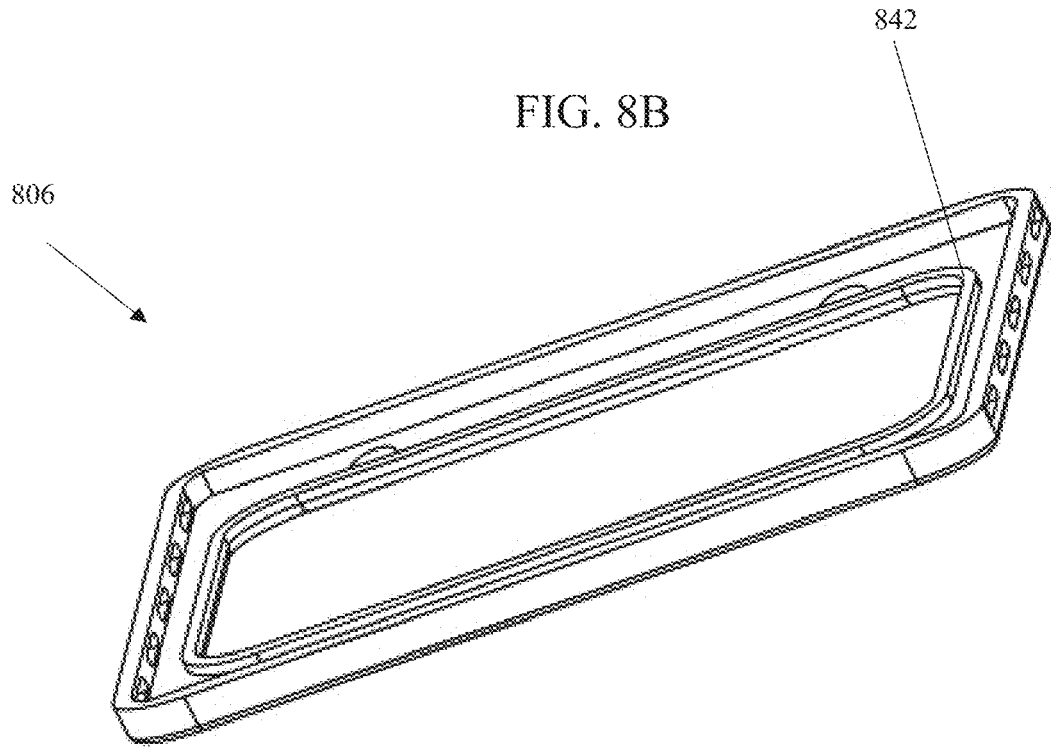
FIG. 8B is a rear, perspective view of the cover plate of FIG. 8A.
Figure 9:
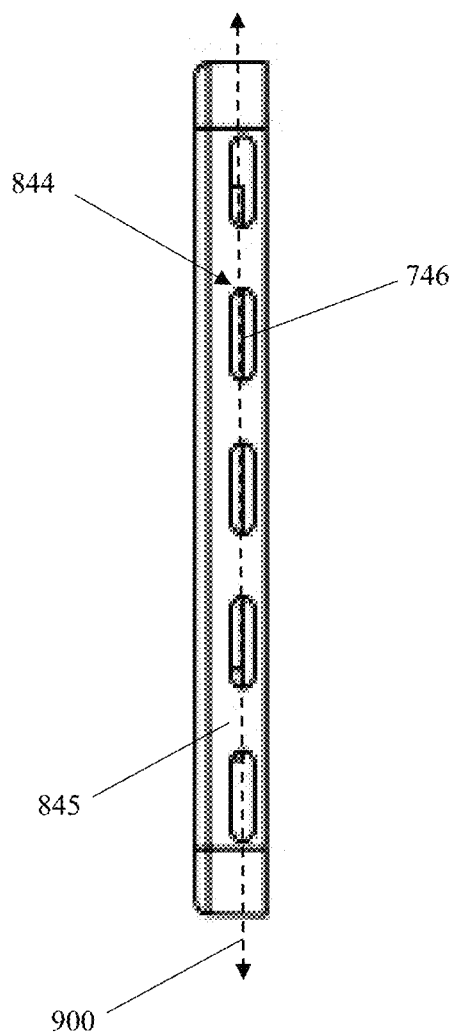
FIG. 9 is a side view of the cover plate of FIG. 8A.

Unless otherwise indicated below, cover plate 806 described with reference to FIGS. 8A, 8B, and 9 is substantially the same as cover plate 106, and thus duplicative descriptions may be omitted below.

The cover plate 806 includes an extended inner lip 842 configured to cover a corresponding inner rim of a base plate. The extended inner lip 842 may extend entirely circumferentially around inner rim 843 of cover plate 846. Thus, the extended inner lip 842 may completely cover the corresponding inner rim of a base plate to which the cover plate 806 is removably coupled.

The cover plate 806 includes a series of orifices 844 formed entirely through a side surface 845 of the cover plate 806. Each orifice 844 is configured to receive a corresponding protrusion (see, e.g., protrusions 105 or 705) therein to secure the cover plate 806 to a base plate. As an example, protrusions may be formed on right and left side surfaces of a base plate (see, e.g., base plates 101 or 701) and corresponding orifices 844 may be formed in positions to receive the protrusions. The orifices 844 are formed through the entire side surface 845 of the cover plate 806. The protrusions (e.g., protrusions 705) may be arranged in the orifices 844 such that distal-most ends 746 of the protrusions 705 are axially aligned with a distal-most end of the corresponding orifices 844 (see, e.g., axis 900) defining a distal-most end of the orifice 844. That is, the protrusions 705 form a flush outer, side surface of the cover plate 806 along axis 900 with the orifices 844.

Figure 10:
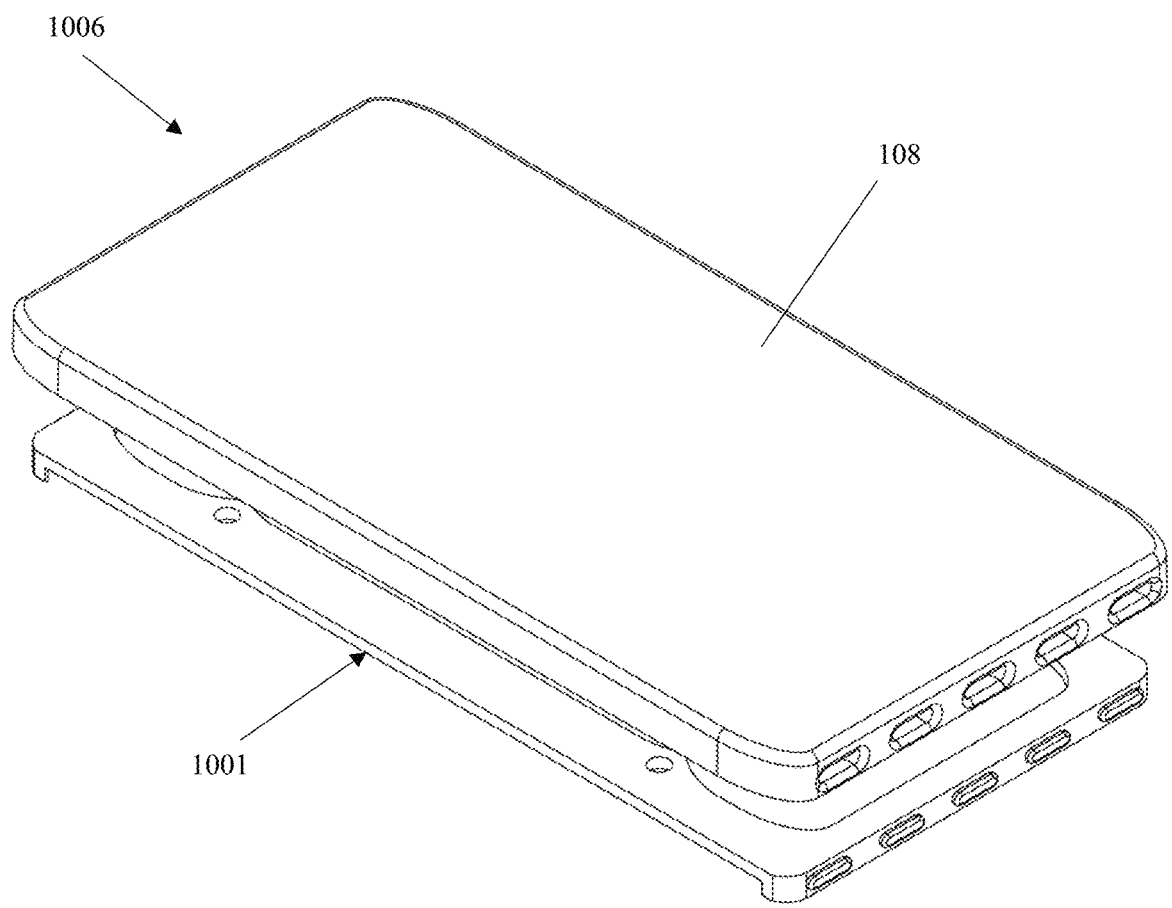
FIG. 10 is a front, perspective view of a cover plate employable with the base plate of FIG. 7.
Figure 11:
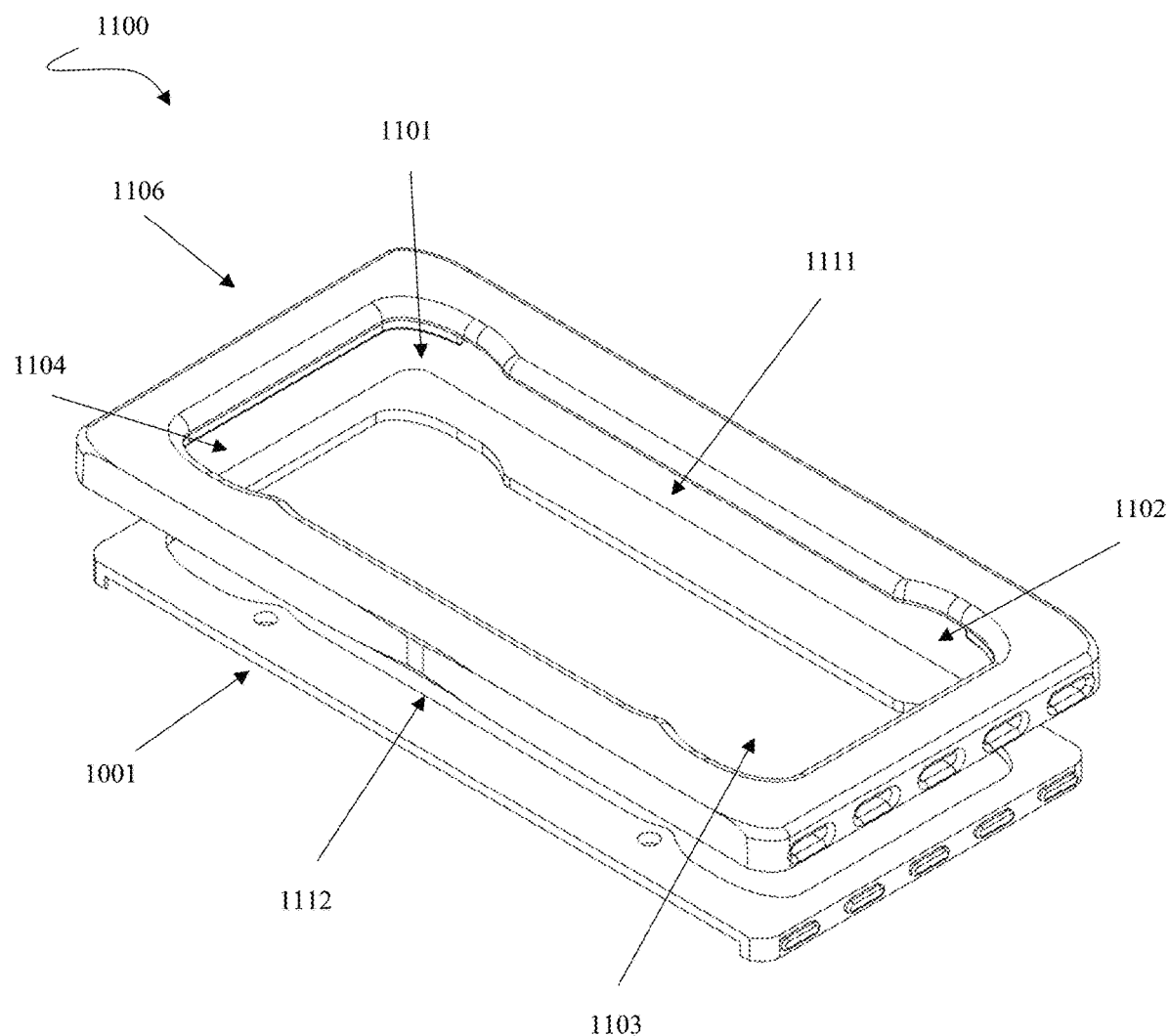
FIG. 11 is a front, perspective view of another license plate cover system according to aspects of the present disclosure.
Figure 12:
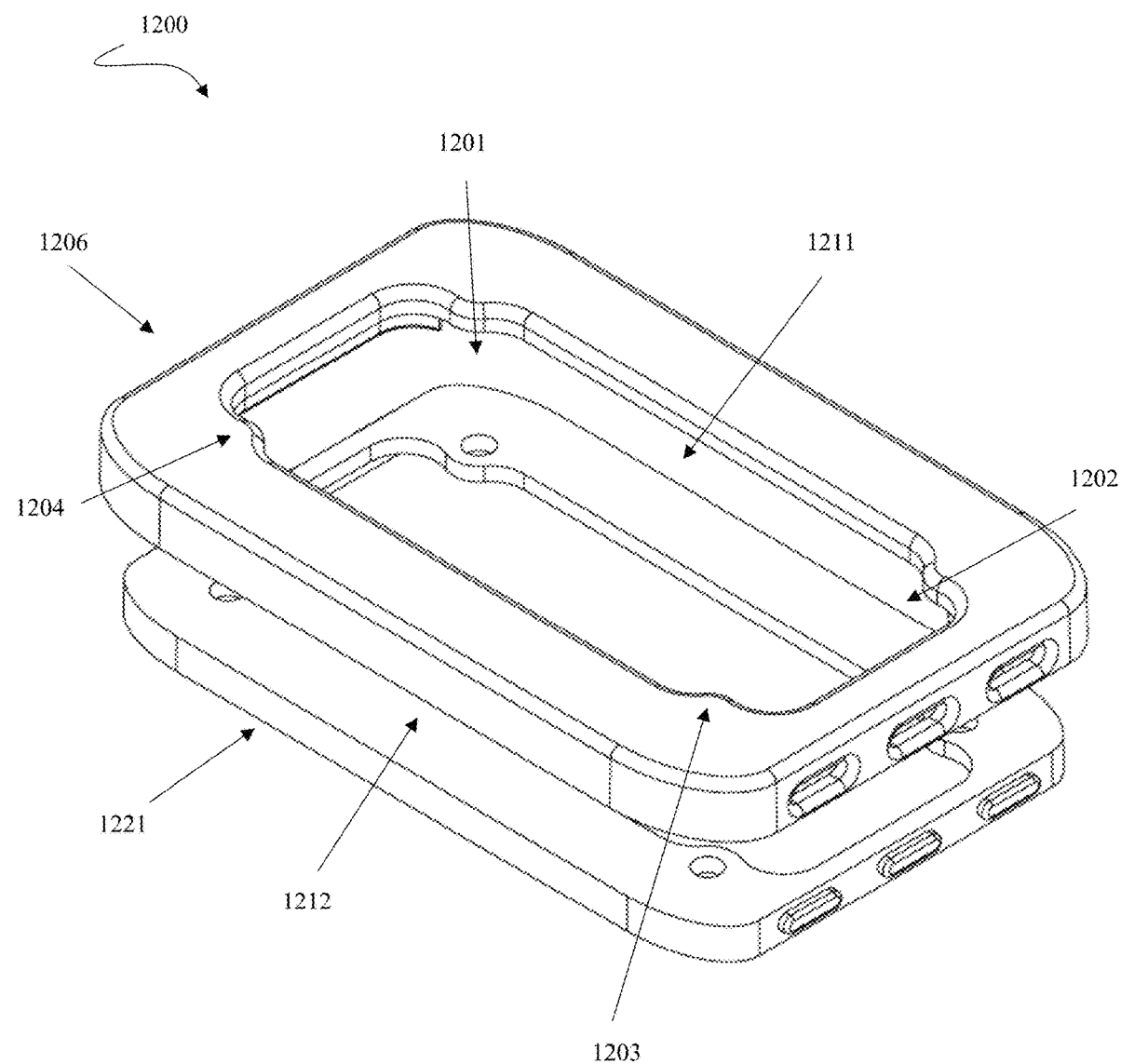
FIG. 12 is a front, perspective view of a license plate cover system employable on a motorcycle according to aspects of the present disclosure.

Unless otherwise indicated below, the cover plates and cover plate systems described below with reference to FIGS. 10 to 12 are substantially the same as the cover plates and cover plate systems described above, and thus duplicative descriptions may be omitted below.

FIG. 10 is a front, perspective view of a cover plate 1006 employable with the base plate 701 described, for example, with reference to FIG. 7, or employable with base plate 1001 (described in more detail below with reference to FIG. 11.

Referring to FIG. 10, the cover plate 1006 is configured for a use on a vehicle without a front license plate. That is, the cover plate 1006 may include a continuous front surface that would block a license plate arranged in base plate 701. As an example, a front surface of the cover plate 1006 may be a substantially flat surface facing away from a corresponding motor vehicle. The cover plate 1006 may substantially conceal the base plate 701 or the base plate 1001 within an inner space defined within cover plate 1006.

FIG. 11 is a front, perspective view of a license plate cover system 1100 according to aspects of the present disclosure.

Referring to FIG. 11, the license plate cover system 1100 includes a base plate 1001 and a cover plate 1006, each of which defines a dog bone shape. The corresponding dog bone shapes of the base plate 1001 and the cover plate 1006 allow the registration information of an underlying license plate to be visible when the registration information is displayed at one or more of the corners of the license plate. That is, the shape defined by the base plate 1001 and the cover plate 1006 is configured to expose the alphanumeric characters of a license plate so they are visible to a person viewing a vehicle. For example, the corner regions 1101, 1102, 1103, and 1104 are exposed or arranged to be smaller with respect to central regions 1111 and 1112 of the base plate 1001 and the cover plate 1006. The dog bone shape of the base plate 1001 is configured to be aligned with the dog bone shape of the cover plate 1006.

FIG. 12 is a front, perspective view of a license plate cover system 1200 employable on a motorcycle according to aspects of the present disclosure.

Referring to FIG. 12, the license plate cover system 1200 includes a base plate 1221 and a cover plate 1206, each of which define a shape in which central regions 1211 and 1212 of the base plate 1221 and the cover plate 1206 are enlarged with respect to central regions 1201, 1202, 1203, and 1204 of the base plate 1221 and the cover plate 1206. The shape defined by the base plate 1221 and the cover plate 1206 is configured to conform with a shape and alphanumeric character arrangement of a motorcycle license plate to expose the alphanumeric characters of the motorcycle license plate. The shape of the base plate 1221 is configured to be aligned with the shape of the cover plate 1206.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A license plate cover system, comprising:
a base plate defining a first surface configured to face a vehicle, a second surface configured to face away from a vehicle, and a first side surface and a second side surface connecting the first surface with the second surface, wherein the base plate includes a plurality of protrusions extending from each of the first side surface and the second side surface, wherein the first side surface and the second side surface define at least one open channel configured to face a vehicle, the at least one open channel configured to expose an upper end or a lower end of a license plate arranged in the base plate such that a license plate is positionable between the base plate and a vehicle; and
a cover plate defining a first surface configured to face the second surface of the base plate, a second surface configured to face away from a vehicle, and an inner side surface connecting the first surface of the cover plate with the second surface of the cover plate, wherein the cover plate includes a plurality of recesses configured to receive the protrusions of the plurality of protrusions therein,
wherein the cover plate is configured to be removably coupled with the base plate by securing the protrusions of the plurality of protrusions in corresponding recesses of the plurality of recesses.

2. The license plate cover system of claim 1, further including at least two orifices defined through the first surface and the second surface of the base plate, wherein the at least two orifices are configured to secure the base plate to a vehicle.

3. The license plate cover system of claim 2, further including at least two recesses defined in the first surface of the cover plate, wherein each recess of the at least two recesses defined in the first surface of the cover plate is configured to receive a corresponding head of a connecting member connecting the based plate with a vehicle.

4. The license plate cover system of claim 3, further including a cradle defined by the first surface of the base plate, wherein the cradle is configured to receive a license plate therein, and wherein the orifices of the at least two orifices defined through the first surface and the second surface of the base plate are configured to be aligned with at least two corresponding license plate orifices when the license plate is arranged in the cradle.

5. The license plate cover system of claim 4, further including a lip projecting from the first surface of the cover plate, wherein the lip is configured to wrap around the base plate to removably secure the cover plate with the base plate.

6. The license plate cover system of claim 5, wherein the lip is defined circumferentially around the first surface of the cover plate.

7. The license plate cover system of claim 6, wherein the lip includes a material different from a material included in the cover plate.

8. The license plate cover system of claim 1, further including at least two recesses defined in the first surface of the cover plate, wherein each recess of the at least two recesses defined in the first surface of the cover plate is configured to receive a corresponding head of a screw, a bolt, a nail, a fastener, a pin, a tack, a spike, or a rivet.

9. The license plate cover system of claim 1, further including a lip projecting from the first surface of the cover plate, wherein the lip is configured to wrap around the base plate to removably secure the cover plate with the base plate.

10. The license plate cover system of claim 1, wherein the base plate includes metal or plastic, and wherein the cover plate includes silicone.

11. The license plate cover system of claim 1, wherein the second surface of the cover plate defines at least one decorative feature facing away from a vehicle.

12. The license plate cover system of claim 11, wherein the at least one decorative feature includes at least one recess defined in the second surface of the cover plate, wherein the at least one recess is configured to removably receive a decorative insert therein.

13. The license plate cover system of claim 1, wherein the at least one open channel faces along a direction substantially perpendicular to a direction the first side surface or the second side surface faces.

14. The license plate cover system of claim 1, wherein at least one of the first side surface or the second side surface defines a central portion thereof, and wherein the plurality of protrusions includes at least one protrusion extending from the central portion of the first side surface or the second side surface.

15. A license plate cover system, comprising:
a base plate defining a first surface configured to face a vehicle, a second surface configured to face away from a vehicle, a cradle defined by the first surface and including an inward-facing sidewall, and a first side surface and a second side surface connecting the first surface with the second surface, wherein the base plate includes at least one protrusion extending from each of the first side surface and the second side surface, wherein the first side surface and the second side surface define at least one open channel configured to expose an upper end or a lower end of a license plate arranged in the cradle between the base plate and a vehicle; and
a cover plate defining a first surface configured to face the second surface of the base plate, a second surface configured to face away from a vehicle, and an inner side surface connecting the first surface of the cover plate with the second surface of the cover plate, wherein the cover plate includes at least one recess configured to receive the at least one protrusion therein, wherein the cover plate is configured to be removably coupled with the base plate by securing the at least one protrusion with the at least one recess.

16. The license plate cover system of claim 15, further including at least two orifices defined through the first surface and the second surface of the base plate, wherein the at least two orifices are configured to secure the base plate to a vehicle.

17. The license plate cover system of claim 16, further including at least two recesses defined in the first surface of the cover plate, wherein each recess of the at least two recesses defined in the first surface of the cover plate is configured to receive a corresponding head of a connecting member connecting the based plate with a vehicle.

18. The license plate cover system of claim 17, wherein the orifices of the at least two orifices defined through the first surface and the second surface of the base plate are configured to be aligned with at least two corresponding license plate orifices when the license plate is arranged in the cradle.

19. The license plate cover system of claim 18, further including a lip projecting from the first surface of the cover plate, wherein the lip is configured to wrap around the base plate to removably secure the cover plate with the base plate.

20. The license plate cover system of claim 15, further including at least two recesses defined in the first surface of the cover plate, wherein each recess of the at least two recesses defined in the first surface of the cover plate is configured to receive a corresponding head of a screw, a bolt, a nail, a fastener, a pin, a tack, a spike, or a rivet.

* * * * *